Figure 1:
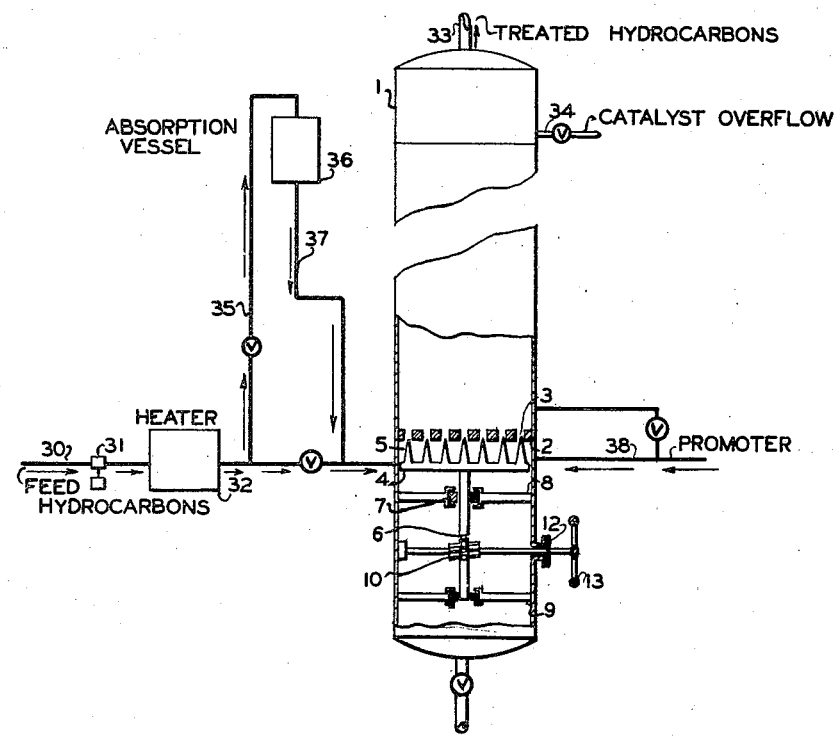

Nov. 27, 1945.  L. R. STRAWN  2,389,651
PROCESS FOR CATALYTICALLY CONVERTING HYDROCARBONS BY THE
ACTION OF LIQUID ALUMINUM HALIDE-HYDROCARBON COMPLEX
Filed April 17, 1943

LYNN R. STRAWN
INVENTOR

BY

HIS ATTORNEY

Patented Nov. 27, 1945

2,389,651

UNITED STATES PATENT OFFICE 2,389,651

PROCESS FOR CATALYTICALLY CONVERTING HYDROCARBONS BY THE ACTION OF LIQUID ALUMINUM HALIDE-HYDROCARBON COMPLEX

Lynn R. Strawn, Port Arthur, Tex., assignor to The Texas Company, New York, N. Y., a corporation of Delaware Application April 17, 1943, Serial No. 483,440

4 Claims. (Cl. 260—683.5)

This invention relates to method of effecting hydrocarbon conversion by catalytic action.

The invention has to do with conversion reactions such as isomerization of hydrocarbons in the liquid phase by the action of a liquid catalyst of relatively greater density than the hydrocarbons undergoing treatment. Liquid catalysts contemplated comprise metallic halide hydrocarbon complexes which are used in the presence of a promoter such as hydrogen halide.

Catalysts of this type have been referred to in a pending application, Serial No. 448,728, filed in the name of William R. Smith for Catalytic isomerization. As described in the application in question a suitable complex catalyst for effecting the isomerization of normal paraffin hydrocarbons consists of aluminum halide-hydrocarbon complex which is free from solids that would be separated by centrifuging at about 3000 R. P. M. for a period of half an hour in an A. P. I. centrifuge at about normal room temperature. The complex catalyst so prepared is characterized by having a heat of hydrolysis of about 200 to 400 and preferably about 300 to 320 or 330 calories per gram of complex.

It has been found advantageous to effect a conversion reaction such as isomerization with this type of liquid catalyst by passing the feed hydrocarbon in dispersed liquid phase through a comparatively stationary body or column of the liquid catalyst, the hydrocarbon rising through the body of liquid catalyst by difference in density. Advantageously the volume of catalyst is large relative to the volume of hydrocarbons undergoing conversion within the reaction zone. For example, the volume of catalyst may range from 2 to 100 times the volume of hydrocarbons undergoing treatment within the reactor.

More specifically the operation is carried out by passing the feed hydrocarbon in a highly dispersed state upwardly through an unpacked tower containing a column of liquid catalyst of substantial depth, the tower being entirely free from obstruction such as stirring mechanism so that substantial coalescence of the hydrocarbon dispersion is avoided.

One advantage of effecting conversion merely by bubbling the hydrocarbons undergoing treatment through a stationary or quiescent body of liquid metallic halide-hydrocarbon complex of the character contemplated is that migration of the aluminum halide catalyst from the reaction zone is avoided, the hydrocarbon stream leaving the reaction zone being free from aluminum halide.

Another advantage is that it avoids the necessity for agitating mechanism and also the necessity for recycling catalyst through the system. Such recycling requires the employment of pumps and passages of restricted cross-sectional area and such equipment is subject to considerable wear and tear with the complex type of catalyst in the presence of a hydrogen halide promoter.

It is desirable that the feed hydrocarbons be introduced to the lower portion of the column of liquid catalyst in a uniform dispersion of fine droplets or particles extending over the entire cross-sectional area of the tower. The rate of feed introduction should be controlled so as to avoid channelling of the hydrocarbons flowing through the catalyst. It is also desirable to have the hydrocarbons remain as discrete particles during passage through the liquid catalyst. Therefore, it is important to control conditions of operation so as to avoid substantial coalescence of the individual particles during passage through the tower.

A high drop velocity without drop coalescence is desirable particularly with respect to obtaining a high level of conversion, in the case of an isomerization reaction, without substantial occurrence of side reactions which might otherwise occur under the prevailing conditions of catalyst activity and reaction temperature. A suitable drop velocity may range from 0.8 inch to 5.0 feet per second through the liquid catalyst, the optimum velocity being about 1.25 to 2.5 feet per second.

Drop velocity is dependent largely on drop diameter, the larger the drop the more rapidly it rises through the complex catalyst liquid. It appears important to maintain the drop diameter within the range about $\frac{1}{64}$ to $\frac{1}{4}$ inch.

If the drop diameter is too small emulsification between hydrocarbons and catalyst liquid occurs and this is undesired from the standpoint of avoiding overexposure of particles of the feed to the catalyst with occurrence of side reactions and also from the standpoint of catalyst carry-over with the hydrocarbon stream leaving the reaction tower.

On the other hand if the drop diameter is too large the hydrocarbons rise through the complex so rapidly as to permit insufficient time of contact and, therefore, the conversion yield is too low.

The foregoing range of drop diameter has been found effective in isomerizing normal butane during passage through a column of complex catalyst liquid ranging from about 15 to 25 feet so that the hydrocarbon is in contact with the catalyst for not in excess of about 1 to 10 minutes.

Accordingly, the present invention is particularly concerned with means for effecting uniform dispersion of the feed hydrocarbon through the catalyst mass without substantial coalescence of the individual particles. The invention comprises effecting the reaction in a tower type of reactor having means for regulating the size of liquid hydrocarbon droplets rising through the liquid catalyst.

In accordance with the invention a stationary horizontal plate is supported within the lower portion of the tower having its peripheral edge contiguous with the adjacent inner wall surface of the tower, the plate in question having a plurality of holes forming separate orifices therein. The holes or orifices are uniformly spaced over the cross-sectional area of the plate. Adjustable means are provided for varying the effective size of the hole or orifice so that the size of the hydrocarbon liquid droplets may be controlled as desired.

One suitable means for varying the effective size of the orifice holes involves providing a separate and movable plate horizontally disposed so that the adjacent horizontal surfaces of the stationary and movable plates are contiguous. Orifice holes are provided in the movable plate corresponding to each of the holes in the fixed plate and being of substantially the same diameter so that the adjacent holes in the fixed and movable plates form therewith single orifice openings through the adjoining plates when the position of the movable plate is such that the corresponding holes in both plates are centered.

The movable plate is arranged so that it may be displaced laterally, or may be rotated about its axis, a small amount thereby decreasing the effective cross-sectional area of the orifice openings depending upon the extent to which the movable plate is displaced or rotated from normal.

An alternative means of adjusting the orifice size involves providing conical members positioned below the orifice openings so that the vertex of each orifice member is centered at the middle of each hole in the plate immediately above. The conical members are advantageously fixed upon a supporting member arranged for vertical movement so that upon elevating the supporting member the conical members penetrate the orifice openings, the extent of penetration depending upon the degree to which the supporting member is raised or lowered. By raising the supporting member the extent of penetration is increased thereby decreasing the effective cross-sectional area of the orifice openings.

In order to describe the invention in more detail reference will now be made to the figures of the accompanying drawing.

Fig. 1 shows a vertical tower reactor 1 which may have a diameter of about 4 feet, for example. It may have a height of about 30 feet. However, the diameter and height of the reactor may be varied as desired, advantageously maintaining the column of catalyst liquid such that its height is some 4 to 10 times more than its diameter. In the lower portion of the tower there is a horizontal plate 2 having a plurality of orifice openings 3. As indicated the peripheral edge of the plate 2 may be made integral with the inner and adjacent wall surface of the tower.

Immediately below the plate 2 is supported a member 4, which may be in the form of a plate or grid having a plurality of conical members 5, there being one conical member corresponding to each orifice opening in the plate 2. The vertices of the conical members 5 are centered at the middle of each corresponding orifice opening.

The member 4 as indicated in the drawing is held on a vertical shaft 6 rotatably supported in a bearing 7 supported by suitable brackets 8 extending from the inner walls of the tower. The lowermost end of the shaft 6 may likewise be rotatably supported in a lower bearing 9.

A portion of the shaft 6 is threaded as indicated and the threaded portion is in mesh with a threaded gear 10 mounted on a shaft 11 suitably supported within the tower. One end of the shaft 11 extends through a packing gland 12 in the side of the tower and the protruding portion of the shaft 11 terminates in a handwheel 13.

Depending upon the direction in which the wheel 13 is rotated the shaft 6 is either raised or lowered and likewise the conical members 5.

The conical members may have a pyramidal form having three or four edges or faces which may be concave so that as the cone is fitted into the orifice there will be three or four small openings in each orifice from which bubbles will be formed.

The further the conical members 5 are inserted in the corresponding orifice openings 3 the smaller will be the size of liquid hydrocarbon droplet discharged into the body of liquid catalyst immediately above the plate 2.

As previously mentioned the member 4 may be a grid. This is advantageous in providing free passage of liquid through the spaces between the cones. Otherwise provision must be made for passage of liquid around the edges of the grid or plate. If a plate is used it may be provided with a large number of openings to permit the passage of liquid into the orifice openings.

Figure 2:
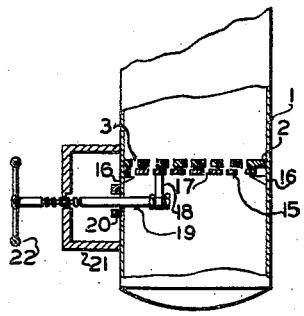

Fig. 2 illustrates an alternative scheme for varying the effective area of the orifice openings. As there shown a fixed orifice plate 2 is supported within the lower portion of the tower 1 while a corresponding but movable plate 15 is supported on suitable brackets 16 attached to the inner wall of the tower. The bracket members are positioned so that the upper surface of the movable plate 15 is in sliding contact with the lower surface of the fixed plate 2.

Likewise the movable plate 15 has a plurality of orifice openings 17 corresponding to each of the orifice openings 3 in the fixed plate 2.

Suspended from the lower surface of the movable plate 15 is a bracket member 18. The bracket member 18 is connected to a horizontal shaft 19 which extends through a packing gland 20 in the wall of the tower.

A portion of the shaft extending beyond the packing gland is advantageously threaded, the threaded portion extending through a threaded opening in a bracket 21. The exterior end of the shaft terminates in a handwheel 22 by which means the shaft may be manually rotated. Upon manual rotation the threaded portion of the shaft causes the shaft to be moved in or out of the tower in a horizontal direction depending upon the extent to which the wheel 22 is turned.

In this way the movable plate 15 may be moved to a small extent in a lateral direction so that in effect it functions as a shutter thereby providing means for varying the size of the orifice openings through the contiguous plates 2 and 16.

While lateral movement has been described specifically it will be understood that instead, the plate 15 may be rotated horizontally about its vertical axis, in which case somewhat different means will be required to effect its rotation.

The movable plate 15 may have holes of different diameter arranged in sets, the holes of one set being 1/8 inch diameter while those of another set are of 1/16 inch diameter. With the plate 15 in one position the holes of one set may be in mesh with the holes of the fixed plate, while in another position the holes of the other set will be in mesh, the holes of the fixed and upper plate corresponding in diameter to the largest holes of the two sets.

Various means may be employed for either varying the orifice diameter or for varying the number of orifices actually effective at any one time.

The orifice holes should be spaced at least 2 or 3 diameters from center to center to avoid interfering contact between adjacent bubbles as ejected from the orifices.

In employing the apparatus for an isomerization reaction reference may be made again to Fig. 1. As there indicated a feed hydrocarbon such as normal butane may be conducted from a source not shown through a pipe 30 and forced by a pump 31 through a heater 32. From the heater 32 the heated normal butane at a temperature which may range from 188 to 240° F. is introduced to the lower portion of the tower 1 at a point just below the plate 2. The complex catalyst, aluminum chloride-hydrocarbon complex, is maintained within the tower 1 in a relatively quiescent condition and extending to a height of about 25 feet. There is thus provided a column of liquid complex within the tower of about 25 feet through which the feed hydrocarbon droplets rise. If desired this may be varied so that the depth of catalyst may range from 10 or 15 to 30 feet.

The position of the conical member 4 is adjusted as previously described so as to maintain the proper size orifice opening whereby the droplet size of the rising hydrocarbons is controlled.

The treated hydrocarbons accumulate in the upper several feet of the tower 1 which provides a separating or settling space. The effluent hydrocarbons are continuously withdrawn from the top of the tower through a pipe 33 leading to a fractionator not shown. Due to the nature of the catalyst the effluent hydrocarbons are free from aluminum halide.

A small amount of complex catalyst is advantageously permitted to overflow from the tower through a pipe 34.

A small portion of the heated feed hydrocarbon stream is passed through a branch pipe 35 to a vessel 36 containing lump aluminum chloride. The resulting solution of aluminum chloride in feed hydrocarbon passes from the vessel 36 through a pipe 37 communicating with the charge inlet to the reactor.

The amount of aluminum chloride solution thus added to the reactor is adjusted so as to maintain the main body of complex catalyst within the reactor of such character that it has a heat of hydrolysis in the range about 200 to 400 and preferably about 300 to 320 calories per gram of complex.

The heat of hydrolysis may be determined by mixing a minor proportion of the complex with a major proportion of water in a standard calorimeter. For example, in making the determination about 3 grams of complex may be mixed with about 300 grams of water.

In starting up the reactor it may be filled with a quantity of previously used complex or with a quantity of preformed complex liquid. This preformed complex liquid may be obtained by reacting aluminum chloride with kerosene which is substantially free from olefinic and aromatic hydrocarbons. This may be done by charging into a closed vessel aluminum chloride and the kerosene in the proportion of about 425 pounds of aluminum chloride per gallon of kerosene. The vessel is closed and the temperature of the mixture raised to 200° F. Hydrogen chloride vapor is added until the pressure stabilizes at 35 pounds per square inch gauge. During mechanical mixing over a period of 2 of 3 hours the pressure will begin to rise and the cracked gases are vented out until the pressure drops to about 25 pounds. The vessel is again closed and repressured with hydrogen chloride to 35 pounds. This venting and repressuring with hydrogen chloride may be repeated 2 or 3 times during a period of 8 or 9 hours required for stabilizing the complex.

Referring again to Fig. 1 the isomerization reaction is carried out in the presence of a promoter such as hydrogen chloride. This promoter is drawn from a source not shown through a pipe 38 and introduced to the tower at a point below the plate 2. Advantageously the promoter is separately injected to the tower.

While mention has been made of aluminum chloride in preparing the complex it is also contemplated that other metallic halides including aluminum bromide may be employed. It is also contemplated that other promoters besides hydrogen chloride may be employed, including other members of the hydrogen halides.

Although isomerization has been specifically described it is contemplated that the process disclosed and also the apparatus disclosed may be employed in effecting other types of catalytic conversion reactions, as, for example, the alkylation of isoparaffin hydrocarbons with olefin hydrocarbons by the action of a metallic halide-hydrocarbon complex type of catalyst.

While certain specific structures have been shown in the drawing nevertheless it is contemplated that the form of the structures and the specific means of supporting the various positions thereof in the reaction tower may be varied, the drawing being merely illustrative of the type of means which may be employed for effecting the invention.

Obviously many modifications and variations of the invention, as hereinbefore set forth, may be made without departing from the spirit and scope thereof, and therefore only such limitations should be imposed as are indicated in the appended claims.

I claim:

1. A process for catalytically converting hydrocarbons by the action of liquid aluminum halide-hydrocarbon complex conversion catalyst maintained in the presence of hydrogen halide under conversion conditions which comprises maintaining a substantially static column of liquid aluminum halide-hydrocarbon complex catalyst in a reaction tower, said complex having a heat of hydrolysis in the range 200 to 400 calories per gram of complex introducing feed hydrocarbons in liquid phase to the lower portion of said catalyst column, dispersing the introduced feed hydrocarbons uniformly within and over substantially the entire cross-sectional area in the lower portion of said column in liquid droplets ranging from about 1/64 to 1/4 inch in diameter, said droplets rising through the catalyst in the presence of hydrogen halide by difference in density, maintaining said droplets in transit through the catalyst liquid for not more than about 1 to 10 minutes and thereafter withdrawing the hydrocarbons from further contact with the catalyst.

2. A process for isomerizing hydrocarbons by the action of liquid aluminum halide-hydrocarbon complex isomerization catalyst maintained in the presence of hydrogen halide under isomerizing conditions which comprises maintaining a substantially static column of liquid aluminum halide-hydrocarbon complex catalyst in a reaction tower, introducing feed hydrocarbons in liquid phase to the lower portion of said catalyst column, dispersing the introduced feed hydrocarbons uniformly within and over substantially the entire cross-sectional area in the lower portion of said column in liquid droplets ranging from about 1/64 to 1/4 inch in diameter, said droplets rising through the catalyst in the presence of hydrogen halide by difference in density, maintaining the distance of travel of said droplets through the column within the range about 10 to 30 feet such that isomerization constitutes the predominant reaction and thereafter withdrawing the hydrocarbons from further contact with the catalyst.

3. A process for isomerizing normal butane which comprises maintaining a substantially static column of liquid aluminum chloride-hydrocarbon complex catalyst in a reaction tower, said complex having a heat of hydrolysis of about 300 to 330 calories per gram of complex, introducing normal butane in liquid phase to the lower portion of said catalyst column, dispersing the introduced butane uniformly within and over substantially the entire cross-sectional area in the lower portion of said column in liquid droplets ranging from about 1/64 to 1/4 inch in diameter, said droplets rising through the catalyst at a temperature of about 188 to 240° F. in the presence of hydrogen halide and by difference in density, maintaining the distance of travel of said droplets through the liquid column within the range about 10 to 30 feet such that isomerization constitutes the predominant reaction, and thereafter withdrawing the hydrocarbons from further contact with the catalyst.

4. A process for isomerizing hydrocarbons by the action of liquid aluminum halide-hydrocarbon complex isomerization catalyst maintained in the presence of hydrogen halide under isomerizing conditions which comprises maintaining a substantially static column of liquid aluminum halide-hydrocarbon complex catalyst in a reaction tower, introducing feed hydrocarbons in liquid phase to the lower portion of said catalyst column, dispersing the introduced feed hydrocarbons uniformly within and over substantially the entire cross-sectional area in the lower portion of said column in liquid droplets ranging fom 1/64 to 1/4 inch in diameter, said droplets rising through the catalyst in the presence of hydrogen halide by difference in density, maintaining said droplets in transit through the catalyst liquid for not more than about 1 to 10 minutes such that isomerization constitutes the predominant reaction, and thereafter withdrawing the hydrocarbons from further contact with the catalyst.

LYNN R. STRAWN.